(12) United States Patent
Nagata et al.

(10) Patent No.: US 9,386,599 B2
(45) Date of Patent: Jul. 5, 2016

(54) RADIO COMMUNICATION SYSTEM, RADIO BASE STATION APPARATUS AND RADIO COMMUNICATION METHOD

(71) Applicant: NTT DOCOMO, INC., Tokyo (JP)

(72) Inventors: Satoshi Nagata, Tokyo (JP); Xiang Yun, Beijing (CN); Xiaoming She, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/357,579

(22) PCT Filed: Nov. 22, 2012

(86) PCT No.: PCT/JP2012/080276
§ 371 (c)(1),
(2) Date: May 13, 2014

(87) PCT Pub. No.: WO2013/077392
PCT Pub. Date: May 30, 2013

(65) Prior Publication Data
US 2014/0348096 A1 Nov. 27, 2014

(30) Foreign Application Priority Data
Nov. 24, 2011 (JP) .................................. 2011-256054

(51) Int. Cl.
*H04W 72/12* (2009.01)
*H04B 7/02* (2006.01)
(Continued)

(52) U.S. Cl.
CPC ........... *H04W 72/1247* (2013.01); *H04B 7/024* (2013.01); *H04B 7/0632* (2013.01); *H04B 7/0639* (2013.01); *H04L 5/0035* (2013.01); *H04L 5/0075* (2013.01); *H04W 48/20* (2013.01)

(58) Field of Classification Search
CPC .... H04B 17/382; H04B 7/024; H04L 5/0035; H04W 72/048; H04W 72/10; H04W 72/1247; H04J 2211/001
See application file for complete search history.

(56) References Cited

U.S. PATENT DOCUMENTS 8,254,938 B2    8/2012  Zhu et al.
8,750,887 B2 *  6/2014  Chandrasekhar ..... H04L 5/0096
                                                    370/252

(Continued)

FOREIGN PATENT DOCUMENTS

JP    2011-35910 A     2/2011
JP    2011-166204 A    8/2011

OTHER PUBLICATIONS

International Search Report for corresponding International Application No. PCT/JP2012/080276, mailed Dec. 18, 2012 (2 pages).
Nokia Siemens Networks et al.; "CoMP phase1 performance evaluation summary;" 3GPP TSG-RAN WG1 Meeting #65, R1-111733; Barcelona, Spain; May 9-14, 2011 (8 pages).

(Continued)

*Primary Examiner* — Xavier Szewai Wong
(74) *Attorney, Agent, or Firm* — Osha Liang LLP

(57) ABSTRACT

The present invention is designed to provide a radio communication system, a radio base station apparatus and a radio communication method which can realize high transmission rate while reducing the calculation load involved in CoMP scheduling. The present invention provides a radio communication system including a plurality of radio base station apparatuses and a user terminal that is configured to be able to perform coordinated multiple point transmission/reception with the plurality of radio base station apparatuses, and, in this radio communication system: the radio base station apparatus has: an operation section (420) that calculates the priority of a pattern to be a candidate for radio resource allocation, which is determined based on candidate cell information that is reported from the user terminal and that shows a candidate of a cell to perform coordinated multiple point transmission; and a scheduling section (421) that executes scheduling based on the priority calculated in the operation section; and the user terminal has: a reporting section that reports the candidate cell information to the radio base station apparatus.

18 Claims, 15 Drawing Sheets

(51) Int. Cl.
*H04B 7/06* (2006.01)
*H04L 5/00* (2006.01)
*H04W 48/20* (2009.01)

(56) References Cited

U.S. PATENT DOCUMENTS

| | | | |
|---|---|---|---|
| 2002/0118691 A1* | 8/2002 | Lefebvre | H04L 49/3081 370/419 |
| 2010/0208677 A1* | 8/2010 | Ahn | H04W 72/1257 370/329 |
| 2010/0291940 A1* | 11/2010 | Koo | H04B 7/024 455/450 |
| 2010/0323712 A1* | 12/2010 | Guey | H04L 5/0041 455/452.2 |
| 2011/0188540 A1 | 8/2011 | Ohwatari et al. | |
| 2012/0052895 A1* | 3/2012 | Clerckx | H04W 72/0426 455/509 |

OTHER PUBLICATIONS

Sun, H. et al.; "Dynamic Cell Clustering Design for Realistic Coordinated Multipoint Downlink Transmission;" IEEE 22nd International Symposium on Personal, Indoor and Mobile Radio Communications (PIMRC); Sep. 14, 2011; pp. 1331-1335 (5 pages).

NEC Group; "Potential gain of DL CoMP with joint transmission;" 3GPP TSG RAN WG1 57, R1-091688; San Francisco, USA; May 4-8, 2009 (5 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action issued in corresponding Japanese Application No. 2011-256054, mailed Dec. 1, 2015 (8 pages).

* cited by examiner

UE-SPECIFIC COOPERATING SET SELECTION

|    | UE0 | UE 1 | UE2 | UE3 | UE 4 | UE5 | UE6 | UE7 | UE8 | UE 9 |
|----|-----|------|-----|-----|------|-----|-----|-----|-----|------|
| C1 | 1   | 1    | 0   | 1   | 0    | 0   | 0   | 0   | 0   | 0    |
| C2 | 0   | 0    | 1   | 1   | 0    | 0   | 0   | 1   | 0   | 0    |
| C3 | 0   | 0    | 0   | 0   | 1    | 1   | 0   | 0   | 0   | 0    |
| C4 | 1   | 0    | 1   | 0   | 0    | 1   | 1   | 1   | 1   | 0    |
| C5 | 0   | 0    | 0   | 0   | 0    | 0   | 1   | 0   | 1   | 1    |

SET OF UE0    SET OF UE3    SET OF UE5

NON-CoMP

| UE | MACRO | LPN1 | LPN2 | LPN3 |
|----|-------|------|------|------|
| A  | ///// |      |      |      |
| B  | ///// |      |      |      |
| C  | ///// |      |      |      |
| D  |       | ///// |      |      |
| E  |       |      | ///// |      |

FIG. 7A

CoMP

| UE | MACRO | LPN1 | LPN2 | LPN3 |
|----|-------|------|------|------|
| A  | ///// | ::::: |      |      |
| B  | ///// |      |      |      |
| C  | ///// |      |      | ::::: |
| D  |       | ///// | ::::: |      |
| E  |       |      | ///// | ::::: |

FIG. 7B

| PATTERN 0 | | MACRO | LPN1 | LPN2 | LPN3 |
|---|---|---|---|---|---|
| STEP. 1 | UE | UE A | UE D | UE E | – |

FIG. 8A

CoMP UE = 1

| PATTERN 1 | | MACRO | LPN1 | LPN2 | LPN3 |
|---|---|---|---|---|---|
| | UE | (UE A) | (UE A) | UE E | – |

| PATTERN 2 | | MACRO | LPN1 | LPN2 | LPN3 |
|---|---|---|---|---|---|
| | UE | (UE C) | UE D | UE E | (UE C) |

| PATTERN 3 | | MACRO | LPN1 | LPN2 | LPN3 |
|---|---|---|---|---|---|
| | UE | UE A | (UE D) | (UE D) | – |

| PATTERN 4 | | MACRO | LPN1 | LPN2 | LPN3 |
|---|---|---|---|---|---|
| | UE | UE A | UE D | (UE E) | (UE E) |

FIG. 8B

CoMP UE = 2

| PATTERN 5 | | MACRO | LPN1 | LPN2 | LPN3 |
|---|---|---|---|---|---|
| | UE | (UE A) | (UE A) | (UE E) | (UE E) |

| PATTERN 6 | | MACRO | LPN1 | LPN2 | LPN3 |
|---|---|---|---|---|---|
| | UE | (UE C) | (UE D) | (UE D) | (UE C) |

FIG. 8C

RADIO COMMUNICATION SYSTEM, RADIO BASE STATION APPARATUS AND RADIO COMMUNICATION METHOD

TECHNICAL FIELD

The present invention relates to a radio communication system, a radio base station apparatus and a radio communication method that are applicable to a cellular system and so on.

BACKGROUND ART

In the UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In the third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band that ranges from 1.4 MHz to 20 MHz. Furthermore, in the UMTS network, for the purpose of achieving further broadbandization and higher speed, successor systems of LTE have been under study (for example, LTE-Advanced (LTE-A)).

CITATION LIST

Non-Patent Literature

Non-Patent Literature 1: 3GPP, TR25.912 (V7.1.0), "Feasibility Study for Evolved UTRA and UTRAN", September 2006

SUMMARY OF THE INVENTION

Technical Problem

As a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonalization is provided between user terminals in the frequency domain. Between cells, like in W-CDMA, interference randomization by repeating one-cell frequency is fundamental.

In the 3GPP (3rd Generation Partnership Project), the coordinated multiple-point transmission/reception (CoMP) technique is under study as a technique for realizing inter-cell orthogonalization. In this CoMP transmission/reception, a plurality of cells (transmission points) coordinate and perform signal processing for transmission and reception for one user terminal or for a plurality of user terminals. For example, for the downlink, simultaneous transmission of a plurality of cells, and coordinated scheduling/beam forming, which adopt precoding, are under study. By adopting these CoMP transmission/reception techniques, improvement of throughput performance is expected, especially with respect to user terminals located on cell edges.

As described above, downlink CoMP transmission is controlled to be applied when there are user terminals located on cell edges, in order to improve the throughput of the user terminals located on cell edges. For example, difference in received quality (the received power of reference signals (RSRP: Reference Signal Received Power) and so on) is determined per cell, and, when the difference is equal to or below a threshold—that is, when the quality difference between cells is insignificant—it is determined that a user terminal is located on a cell edge, and CoMP transmission is applied. The user terminal selects the cell where the gain of CoMP transmission is the maximum, from the cells to be candidates of a coordinated cell, and reports this to the radio base station apparatus.

The radio base station apparatus executes scheduling such that optimal CoMP transmission is realized, based on the information reported from the user terminal. As a scheduling method on the radio base station apparatus side, there is, for example, a method of optimizing scheduling by examining all combinations of user terminals and cells (transmission points) to which CoMP transmission may be applied (exhaustive search). However, although this method achieves a high level of accuracy, the complexity (calculation complexity) is high and therefore is not practical from the perspective of the calculation load. Also, although a method of lowering the complexity and reducing the calculation load (greedy) is also proposed, this method raises a problem that increased loss results in a decrease in the transmission rate.

The present invention has been made in view of the above, and it is therefore an object of the present invention to provide a radio communication system, a radio base station apparatus and a radio communication method which can realize high transmission rate while reducing the calculation load to be involved in CoMP scheduling.

Solution to Problem

A radio communication system according to the present invention is a radio communication system including a plurality of radio base station apparatuses and a user terminal that is configured to be able to perform coordinated multiple point transmission/reception with the plurality of radio base station apparatuses, and, in this radio communication system: the radio base station apparatus has: an operation section that calculates a priority of a pattern to be a candidate for radio resource allocation, which is determined based on candidate cell information that is reported from the user terminal and that shows a candidate of a cell to perform coordinated multiple point transmission; and a scheduling section that executes scheduling based on the priority calculated in the operation section; and the user terminal has: a reporting section that reports the candidate cell information to the radio base station apparatus.

A radio base station apparatus according to the present invention is a radio base station apparatus in a radio communication system including a plurality of radio base station apparatuses and a user terminal that is configured to be able to perform coordinated multiple point transmission/reception with the plurality of radio base station apparatuses, and this radio base station apparatus has: an operation section that calculates a priority of a pattern to be a candidate for radio resource allocation, which is determined based on candidate cell information that is reported from the user terminal and that shows a candidate of a cell to perform coordinated multiple point transmission; and a scheduling section that executes scheduling based on the priority calculated in the operation section.

A radio communication method according to the present invention is a radio communication method in a radio communication system including a plurality of radio base station apparatuses and a user terminal that is configured to be able to perform coordinated multiple point transmission/reception with the plurality of radio base station apparatuses, and this radio communication method includes the steps of: at the radio base station apparatus: calculating a priority of a pattern to be a candidate for radio resource allocation, which is determined based on candidate cell information that is reported from the user terminal and that shows a candidate of a cell to perform coordinated multiple point transmission; and executing scheduling based on the priority calculated in the operation section; and at the user terminal: reporting the candidate cell information to the radio base station apparatus.

Technical Advantage of the Invention

According to the present invention, it is possible to provide a radio communication system, a radio base station apparatus and a radio communication method which can realize high transmission rate while reducing the calculation load to be involved in CoMP scheduling.

BRIEF DESCRIPTION OF THE DRAWINGS

In FIG. 3.

In FIG. 7, FIG. 7A shows a table to show connecting cells in single cell transmission, and FIG. 7B shows a table to show candidate cells in CoMP transmission;

FIG. 8 is a resource diagram to explain specific modes of scheduling;

FIG. 8A shows a pattern that is optimized for single cell transmission, FIG. 8B shows a pattern in which one user terminal requests CoMP transmission, and FIG. 8C shows a pattern in which two user terminals request CoMP transmission;

FIG. 9 provides resource diagrams to explain specific modes of scheduling;

DESCRIPTION OF EMBODIMENTS

Now, embodiments of the present invention will be described below in detail with reference to the accompanying drawings.

Figure 1A:
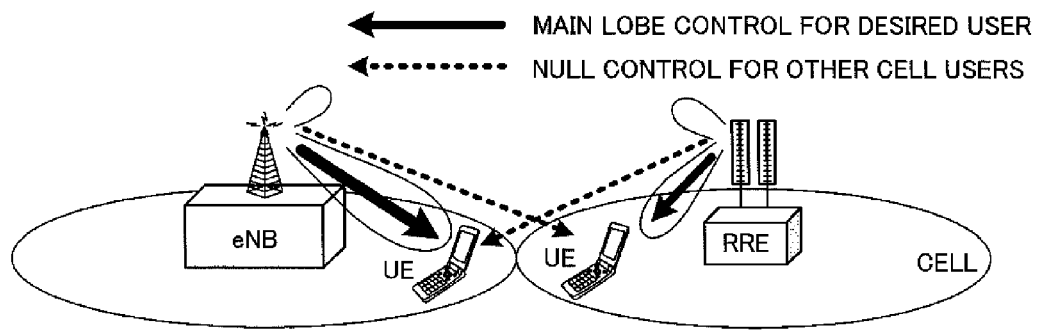
FIG. 1 is a schematic diagram to explain downlink CoMP transmission.
Figure 1B:
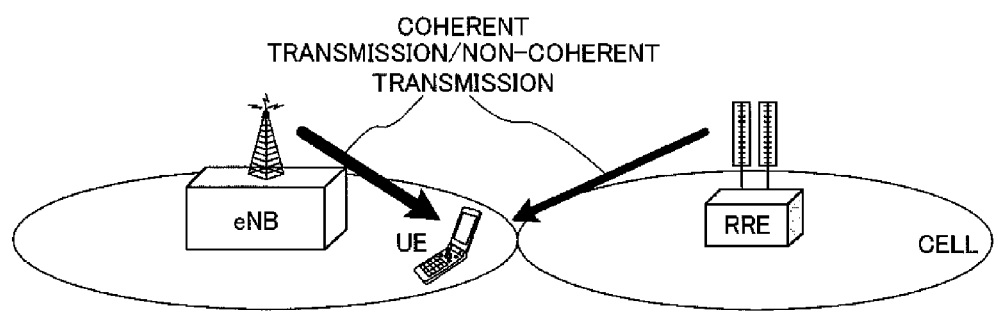
Figure 1C:
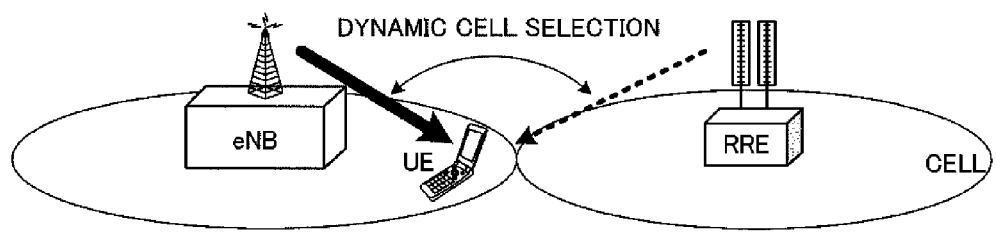

First, downlink CoMP transmission will be described using FIG. 1. Downlink CoMP transmission includes coordinated scheduling/coordinated beamforming and joint processing. Coordinated scheduling/coordinated beamforming refers to a method of transmitting a shared data channel from only one cell to one user terminal UE, and allocates radio resources in the frequency/space domain, taking into account interference from other cells and interference against other cells, as shown in FIG. 1A. Joint processing refers to a method of simultaneously transmitting shared data channels from a plurality of cells by adopting preceding, and includes joint transmission to transmit shared data channels from a plurality of cells to one user terminal UE, as shown in FIG. 1B, and dynamic point selection (DPS) to select one cell dynamically and transmit a shared data channel, as shown in FIG. 1C.

Figure 2A:
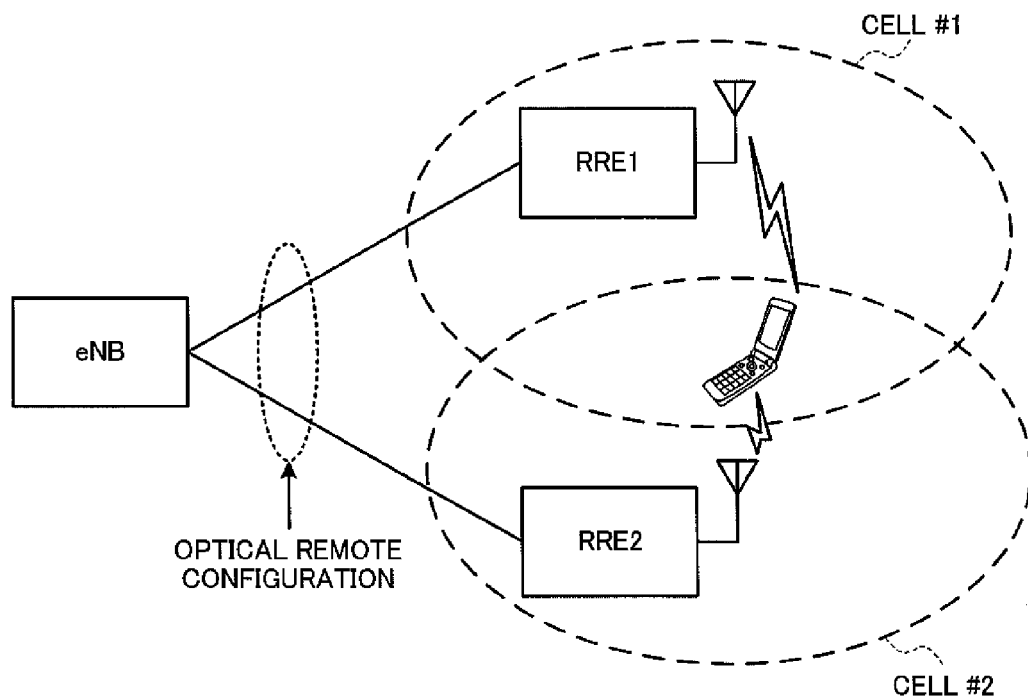
FIG. 2 is a schematic diagram to show a configuration to realize CoMP transmission/reception.
Figure 2B:
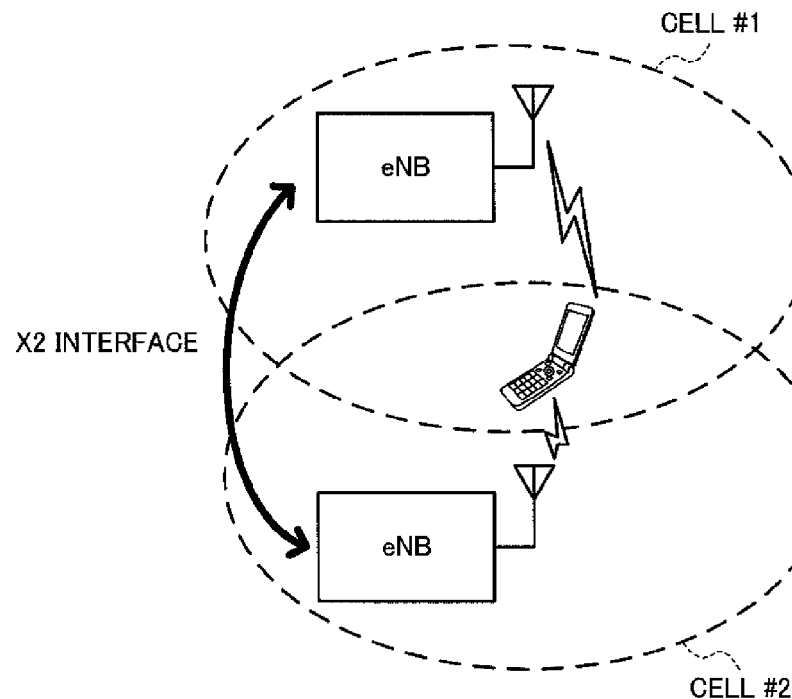

As a configuration to realize CoMP transmission/reception, there are, for example, a configuration (centralized control based on an RRE configuration) to include a plurality of remote radio equipment (RREs) that are connected to a radio base station apparatus (radio base station apparatus eNB) by optical fiber and so on, as shown in FIG. 2A, and a configuration (autonomous distributed control based on an independent base station configuration) to include a plurality of radio base station apparatuses (radio base station apparatus eNBs), as shown in FIG. 2B. Note that, although FIG. 2A shows a configuration to include a plurality of remote radio equipment RREs, it is equally possible to use a configuration to include only single remote radio equipment RRE, as shown in FIG. 1.

In the configuration shown in FIG. 2A (RRE configuration), remote radio equipment RRE 1 and RRE 2 are controlled in a centralized fashion in a radio base station apparatus eNB. In the RRE configuration, a radio base station apparatus eNB (central base station) that performs baseband signal processing and control for a plurality of remote radio equipment RREs, and each cell (that is, each remote radio equipment RRE), are connected by optical fiber, so that it is possible to execute radio resource control between cells in the central base station altogether. This makes high-speed radio resource control between cells relatively easy. Consequently, in the RRE configuration, it is possible to adopt a method to use fast signal processing between cells such as simultaneous transmission of a plurality of cells.

In the configuration shown in FIG. 2B (independent base station configuration), a plurality of radio base station apparatus eNBs (or RREs) each perform radio resource allocation control such as scheduling. In this case, by using the X2 interface between the radio base station apparatus eNB of cell #1 and the radio base station apparatus eNB of cell #2, radio resource allocation information such as timing information and scheduling is transmitted to one of the radio base station apparatus eNBs when necessary, thereby coordinating between the cells.

As described earlier, difference in received quality (for example, the received power of reference signals (RSRP: Reference Signal Received Power)) is determined per cell, and CoMP transmission is applied to user terminals where that difference is equal to or below a threshold. A user terminal selects K cells where the gain of CoMP transmission is maximal, from N cells that can be candidates of CoMP transmission cells, and reports the K cells to the radio base station apparatus. In this way, K cells that are reported from the user terminal to the radio base station apparatus become candidate cells for CoMP transmission cells.

Figures 3A, 3B:
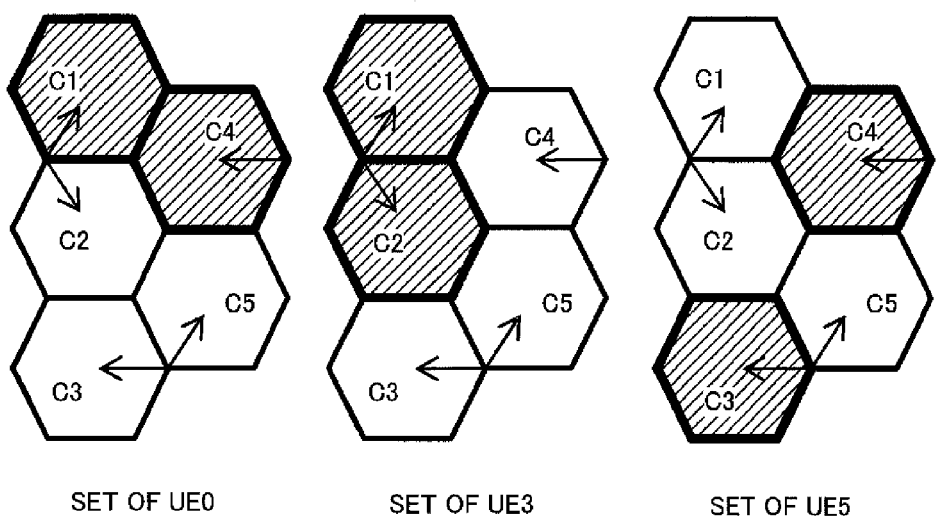
FIG. 3A shows a table to show an example of relationship between each user terminal and candidate cells.
FIG. 3B shows their arrangements.

FIG. 3A shows a table to show an example of relationship between each user terminal (UE 0 to UE 9) and candidate cells (C 1 to C 5), and FIG. 3B shows their arrangements. In FIG. 3A, a "1" represents a cell which each user terminal designates, and a "0" represents an undesignated cell. For example, UE 0 designates two candidate cells, namely C 1 and C 4, as a CoMP transmission cell set. Also, UE 3 designates two candidate cells, namely C 1 and C 2, as a CoMP transmission cell set. Also, UE 5 designates two candidate cells, namely C 3 and C 4, as a CoMP transmission cell set. UE 1, UE 4 and UE 9 do not request CoMP transmission (but request single cell transmission). Information about the candidate cells is reported to the radio base station apparatus as described above.

The radio base station apparatus executes scheduling based on the report from the user terminals. As a scheduling method in the radio base station apparatus, there is, for example, a method of optimizing scheduling by examining all combinations of user terminals and cells (transmission points) to which CoMP transmission may be applied (exhaustive search). However, although this exhaustive search achieves a high level of accuracy, a large number of combinations need to be examined, and the complexity becomes high. To be more specific, the complexity of this method is represented by following equation 1. In following equation 1, K is the maximum number of CoMP transmission cells, M is the number of connecting user terminals per cell, and N is the number of cells to be CoMP transmission cell candidates.

[1]

$$(KM)^N \quad \text{(Equation 1)}$$

As described above, exhaustive search involves a high level of complexity and therefore is not practical from the perspective of the calculation load. By contrast with this, the method called "greedy," which lowers the complexity and reduces the calculation load, has been proposed. However, this method has a problem of involving significant loss and achieving low efficiency. To be more specific, "greedy" lowers the rate by approximately 10 to 15%.

In order to solve the above problem, the present inventors have worked on a method of realizing high transmission rate while reducing the complexity of the CoMP scheduling method. Then, the present inventors have focused on proportional fairness (PF), which assigns weight to priority based on the number of times of radio resource allocation and so on. In PF, the priority of the k-th resource block is represented by following equation 2. In following equation 2, $R_k(n)$ is the data rate of the k-th resource block that is scheduled in the n-th subframe, and $\overline{R(n)}$ is the average data rate of the n-th subframe.

[2]

$$\frac{R_k(n)}{\overline{R(n)}} \quad \text{(Equation 2)}$$

According to this PF, priority is assigned weight according to the number of times of allocation and so on, so that it is possible to improve the transmission rate while maintaining the fairness of radio resource allocation. The present inventors have arrived at the present invention upon finding out that, by applying this concept of PF to the CoMP scheduling method, it is possible to realize high transmission rate while reducing the complexity.

That is to say, a gist of the present invention is to determine a pattern to be a candidate for radio resource allocation based on candidate cell information which is reported from a user terminal and which shows candidates of cells to perform coordinated multiple point transmission, and execute scheduling based on its priority. Note that, in the following description, priority that is assigned weight by PF will be referred to as "$D_i^{(j)}$." $D_i^{(j)}$ is the priority in the case of transmitting from j cells to the I-th user terminal UE.

Figure 4:
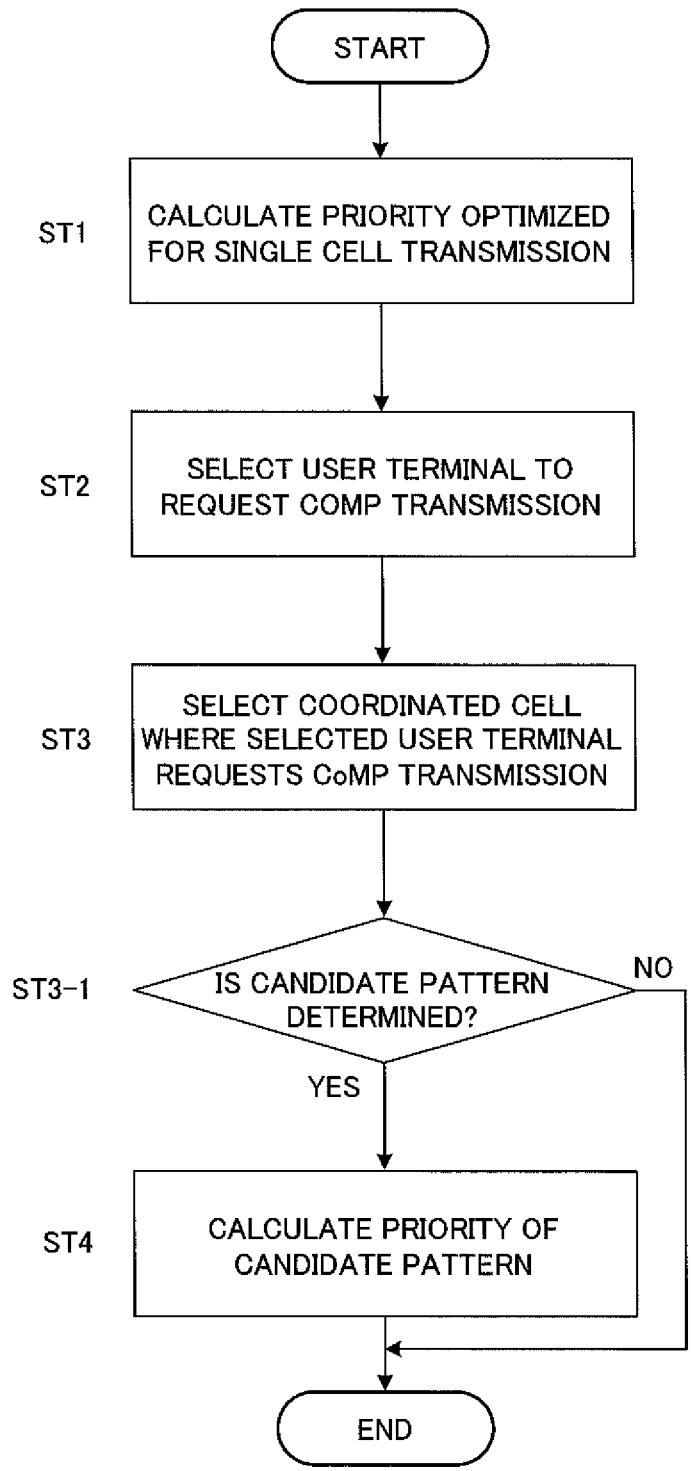
FIG. 4 is a flowchart related to determination of CoMP transmission cells.

FIG. 4 is a flowchart related to determination of CoMP transmission cells in a radio base station apparatus of the present invention. FIG. 5 provides resource diagrams to explain the method of determining CoMP transmission cells in the radio base station apparatus of the present invention. The resource diagrams shown in FIG. 5 are based on the candidate cell sets shown in FIG. 3, and therefore FIG. 3 and FIG. 5 correspond to each other. Also, in FIG. 3 and FIG. 5, the serving cell (connecting cell) of user terminal UE 0 and user terminal UE 1 is C 1, the serving cell of user terminal UE 2 and user terminal UE 3 is C 2, the serving cell of user terminal UE 4 and user terminal UE 5 is C 3, the serving cell of user terminal UE 6 and user terminal UE 7 is C 4, and the serving cell of user terminal UE 8 and user terminal UE 9 is C 5.

As shown in FIG. 4, the radio base station apparatus first calculates the priority of an allocation pattern that is optimized for single cell transmission (step ST 1). Here, in FIG. 5, the relationship of the priorities of individual user terminals in single cell transmission is given by: $D_0^{(1)} > D_1^{(1)}$, $D_2^{(1)} > D_3^{(1)}$, $D_4^{(1)} > D_5^{(1)}$, $D_7^{(1)} > D_6^{(1)}$ and $D_8^{(1)} > D_9^{(1)}$. That is, the priority user terminal UE 0 is higher than the priority of user terminal UE 1, the priority of user terminal UE 2 is higher than the priority of user terminal UE 3, the priority of user terminal UE 4 is higher than the priority of user terminal UE 5, the priority of user terminal UE 7 is higher than the priority of user terminal UE 6, and the priority of user terminal UE 8 is higher than the priority of user terminal UE 9. Then, the radio resource allocation pattern in this case becomes as shown in step ST 1 in FIG. 5A. The priority of this pattern is represented by, for example, the sum of the priorities of the individual user terminals: $D_1^{(1)} + D_2^{(1)} + D_4^{(1)} + D_7^{(1)} + D_8^{(1)}$.

Figure 5A:
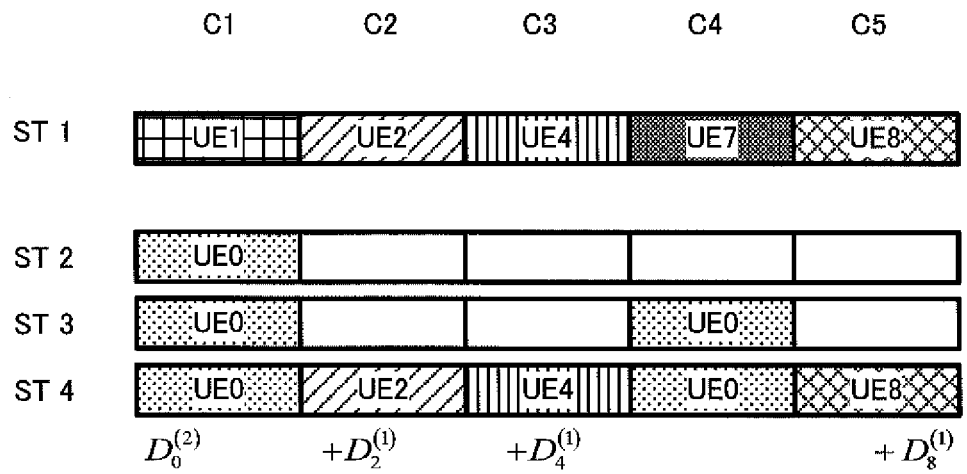
FIG. 5 is a resource diagram to explain a method of determining CoMP transmission cells.

Next, the radio base station apparatus selects a user terminal that requests CoMP transmission to the serving cell (step ST 2). For example, in FIG. 3 and FIG. 5, user terminal UE 0 requests CoMP transmission to C 1. Consequently, the radio base station apparatus selects user terminal UE 0, which is a user terminal to request CoMP transmission, based on a report from user terminal UE 0 (FIG. 5A).

After that, the radio base station apparatus selects the cell, which the user terminal selected in step ST 2 designates as a coordinated cell in CoMP transmission (step ST 3). For example, in FIG. 3 and FIG. 5, user terminal UE 0 makes C 4 a candidate cell for a coordinated cell. Consequently, the radio base station apparatus selects C 4, which user terminal UE 0 selects, based on a report from user terminal UE 0 (FIG. 5A). In this way, when a CoMP transmission cell set is selected, a candidate pattern to be a candidate for radio resource allocation is determined in accordance with this. For example, in the single cell scheduling shown in FIG. 5A, by changing the allocation of C 1 from user terminal UE 1 to user terminal UE 0 and by changing the allocation of C 4 from user terminal UE 7 to user terminal UE 0, a candidate pattern is determined.

When a candidate pattern is determined in this way (step ST 3-1: YES), the radio base station apparatus calculates the priority of the candidate pattern (step ST 4). The priority of the candidate pattern shown in FIG. 5A is, for example, given by the sum of the priorities of the individual user terminals: $D_0^{(2)}+D_2^{(1)}+D_4^{(1)}+D_8^{(1)}$. $D_0^{(2)}$ represents the priority of user terminal UE 0 when CoMP transmission is executed with two cells.

The radio base station apparatus executes scheduling based on the priority of the candidate pattern of CoMP transmission that is calculated in this way and the priority of single cell scheduling calculated in step ST 1. To be more specific, the radio base station apparatus executes scheduling in the radio resource allocation pattern that gives the highest priority.

When a candidate pattern is not determined in step ST 3 (step ST 3-1: NO), the radio base station apparatus does not calculate priority. For example, when, as will be described below, cells where the allocation of user terminals overlaps are included, a candidate pattern is not determined, and this case is excluded from the calculation of priority.

Figure 5B:
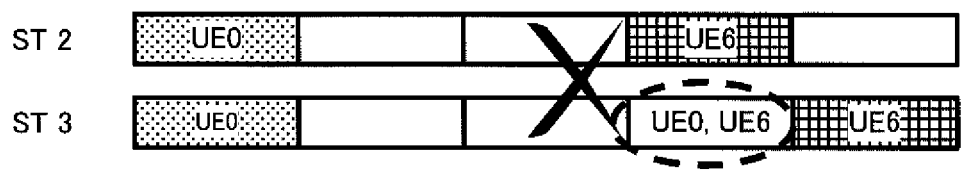

A case in which cells where the allocation of user terminals overlaps are included will be described with reference to FIG. 5B. Assume that, as shown in FIG. 5B, in step ST 2, user terminals UE 0 and UE 6 are selected as user terminals to request CoMP transmission. Then, C 4, which user terminal UE 0 selects as a coordinated cell, and C 5, which user terminal UE 6 selects as a coordinated cell, are selected in step ST 3.

In this case, in C 4, user terminals UE 0 and UE 6 are allocated together. In this case, the radio base station apparatus does not determine a candidate pattern, and excludes this pattern from the calculation of priority. By this means, it is possible to avoid unnecessary calculation.

The complexity of scheduling according to the present invention described above is represented by following equation 3. In following equation 3, x is the number of user terminals to request CoMP transmission in a cluster (coordination cluster), y is the number of user terminals to which CoMP transmission is applied in a cluster, and Y is the maximum number of user terminals which are capable of CoMP transmission in a cluster. $C_x^y$ is the combination when y is selected from x.

[3]

$$\sum_{y=1}^{Y} C_x^y$$ (Equation 3)

In above equation 1 and equation 3, although, with exhaustive search, an increased number of user terminals leads to increased complexity, with the present invention, the complexity is not as high as with exhaustive search. Also, with the present invention, scheduling is executed based on the priority of each candidate pattern as described above, so that it is possible to suppress the decrease of transmission rate sufficiently. In this way, according to the present invention, it is possible to realize high transmission rate while reducing the calculation load to be involved in CoMP scheduling, by using weighted priorities.

Figure 6:
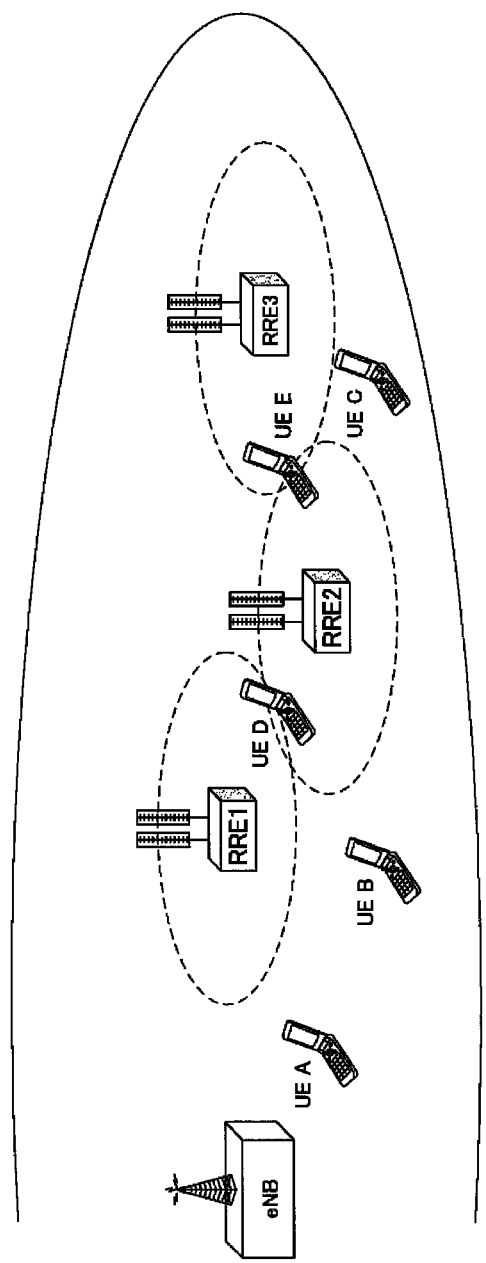
FIG. 6 is a schematic diagram to show a configuration of a radio communication system.

Next, more detailed examples of scheduling will be described with reference to FIG. 6 to FIG. 9. FIG. 6 is a schematic diagram to show a configuration of a radio communication system related to scheduling. The radio communication system shown in FIG. 6 includes a radio base station apparatus (eNB (macro base station)), and remote radio equipment (RRE 1 (LPN (Low Power Node) 1), RRE 2 (LPN 2), RRE 3 (LPN 3)) that is wire-connected with the eNB. Also, the radio communication system includes user terminals UE A, UE B, UE C, UE D and UE E that are capable of radio communication with at least one of the eNB (macro base station), RRE 1 (LPN 1), RRE 2 (LPN 2) and RRE 3 (LPN 3).

FIG. 7A shows a table to show connecting cells in single cell transmission, and FIG. 7B shows a table to show candidate cells of CoMP transmission. The hatching in FIG. 7A and FIG. 7B shows that the applicable user terminals are connected to the corresponding cells or make the corresponding cells candidate cells.

As shown in FIG. 7A, in single cell transmission, user terminals UE A, UE B and UE C are connected with the cell of a macro base station (macro). Also, user terminal UE D is connected with the cell of LPN 1, and user terminal UE E is connected with the cell of LPN 2. Among user terminals UE A, UE B and UE C that are connected with the macro base station, assume that user terminal UE A has the highest priority at given timing.

As shown in FIG. 7B, user terminal UE A makes LPN 1 a candidate cell for a coordinated cell. The user terminal UE C makes LPN 3 a candidate cell for a coordinated cell. The user terminal UE D makes LPN 2 a candidate cell for a coordinated cell. The user terminal UE E makes the cell of LPN 3 a candidate cell for a coordinated cell. The user terminal UE B does not designate a candidate cell for a coordinated cell and does not request CoMP transmission.

FIG. 8 and FIG. 9 are resource diagrams to explain a specific mode of scheduling. As described above, the macro base station first calculates priority optimized for single cell scheduling (step ST 1). To be more specific, the macro base station selects a radio resource allocation pattern that is optimized for single cell scheduling, and calculates its priority. FIG. 8A shows a radio resource allocation pattern that is optimized for single cell transmission. In this pattern, the radio resource of the macro base station is allocated to user terminal UE A having the highest priority among UE A, UE B and UE C that are connected to the macro base station. Also, the radio resource of LPN 1 is allocated to user terminal UE D, and the radio resource of LPN 2 is allocated to user terminal UE E.

Next, the macro base station selects a user terminal to request CoMP transmission (step ST 2). Then, the macro base station selects the cell which the user terminal selected in step ST 2 designates as a coordinated cell in CoMP transmission (step ST 3). By this means, a candidate pattern of radio resource allocation in CoMP transmission is generated. FIG. 8B shows a candidate pattern when one user terminal requests CoMP transmission, and FIG. 8C shows a candidate pattern when two user terminals request CoMP transmission. In FIG. 8B and FIG. 8C, the solid-lined circles indicate cells and user terminals that match the result of step ST 2, and the broken-lined circles indicate cells and user terminals that match the result of step ST 3.

For example, pattern 1 of FIG. 8B, which is a candidate pattern, is generated as follows. The macro base station selects user terminal UE A that is connected to the macro base station as a user terminal to request CoMP transmission (step ST 2). UE A designates the set of the macro base station and LPN 1 as CoMP transmission cell candidates (FIG. 7B). Consequently, the macro base station selects LPN 1 which UE A designates as a coordinated cell in CoMP transmission (step ST 3). Then, a pattern in which UE A is allocated to the macro base station and LPN 1 is generated. As for the other cells (cells other than the CoMP transmission candidate cell), the radio resource allocation pattern that is optimized for single cell scheduling in step ST 1 is applied as is. That is, user terminals that are optimized for single cell scheduling are allocated to LPN 2 and LPN 3. To be more specific, user terminal UE E is allocated to LPN 2, and no user terminal is allocated to LPN 3. By this means, pattern 1, in which UE A is allocated to the macro base station and LPN 1, UE E is allocated to LPN 2 and LPN 3 is blank, is generated.

Likewise, pattern 2 of FIG. 8B is generated as follows. The macro base station selects user terminal UE C that is connected to the macro base station as a user terminal to request CoMP transmission (step ST 2). UE C designates a set of the macro base station and LPN 3 as CoMP transmission cell candidates (FIG. 7B). Consequently, the macro base station selects LPN 3, which UE C designates as a coordinated cell in CoMP transmission (step ST 3). Then, a pattern in which UE C is allocated to the macro base station and LPN 3 is generated. To LPN 1 and LPN 2, user terminals that are optimized for single cell scheduling are allocated. That is, user terminal UE D is allocated to LPN 1, and user terminal UE E is allocated to LPN 2. By this means, pattern 2, in which UE C is allocated to the macro base station and LPN 3, UE D is allocated to LPN 1 and UE E is allocated to LPN 2, is generated.

Also, pattern 3 of FIG. 8B is generated as follows. The macro base station selects UE D that is connected to LPN 1 as a user terminal to request CoMP transmission (step ST 2). UE D designates a set of LPN 1 and LPN 2 as CoMP transmission cell candidates (FIG. 7B). Consequently, the macro base station selects LPN 2 which UE D designates as a coordinated cell in CoMP transmission (step ST 3). Then, a pattern in which UE D is allocated to LPN 1 and LPN 2 is generated. User terminals that are optimized for single cell scheduling are allocated to the macro base station and LPN 3. That is, UE A is allocated to the macro base station, and no user terminal is allocated to LPN 3. By this means, pattern 3, in which UE D is allocated to LPN 1 and LPN 2, UE A is allocated to a macro base station and LPN 3 is blank, is generated.

Also, pattern 4 of FIG. 8B is generated as follows. The macro base station selects user terminal UE E that is connected to LPN 2 as a user terminal to request CoMP transmission (step ST 2). UE E designates a set of LPN 2 and LPN 3 as CoMP transmission cell candidates (FIG. 7B). Consequently, the macro base station selects LPN 3 which UE E designates as a coordinated cell in CoMP transmission (step ST 3). Then, a pattern in which UE E is allocated to LPN 2 and LPN 3 is generated. User terminals that are optimized for single cell scheduling are allocated to the macro base station and LPN 1. That is, UE A is allocated to the macro base station, and UE D is allocated to LPN 1. By this means, pattern 4, in which UE E is allocated to LPN 2 and LPN 3, UE A is allocated to the macro base station and UE D is allocated to LPN 1, is generated.

Also, pattern 5 of FIG. 8C is generated as follows. The macro base station selects user terminal UE A that is connected to the macro base station and UE E that is connected to LPN 2 as user terminals to request CoMP transmission (step ST 2). UE A designates a set of the macro base station and LPN 1 as CoMP transmission cell candidates (FIG. 7B). Consequently, the macro base station selects LPN 1 which UE A designates as a coordinated cell in CoMP transmission (step ST 3). Also, UE E designates a set of LPN 2 and LPN 3 as CoMP transmission cell candidates (FIG. 7B). Consequently, the macro base station selects LPN 3 which UE E designates as a coordinated cell in CoMP transmission (step ST 3). Then, a pattern in which UE A is allocated to the macro base station and LPN 1, and UE E is allocated to LPN 2 and LPN 3, is generated.

Also, pattern 6 of FIG. 8C is generated as follows. The macro base station selects user terminal UE C that is connected to the macro base station and UE D that is connected to LPN 1 as user terminals to request CoMP transmission (step ST 2). UE C designates a set of the macro base station and LPN 3 as CoMP transmission cell candidates (FIG. 7B). Consequently, the macro base station selects LPN 3 which UE C designates as a coordinated cell in CoMP transmission (step ST 3). Also, UE D designates a set of LPN 1 and LPN 2 as CoMP transmission cell candidates (FIG. 7B). Consequently, the macro base station selects LPN 2 which UE D designates as a coordinated cell in CoMP transmission (step ST 3). Then, a pattern, in which UE C is allocated to the macro base station and LPN 3 and UE D is allocated to LPN 1 and LPN 2, is generated.

Figures 9A, 9B:
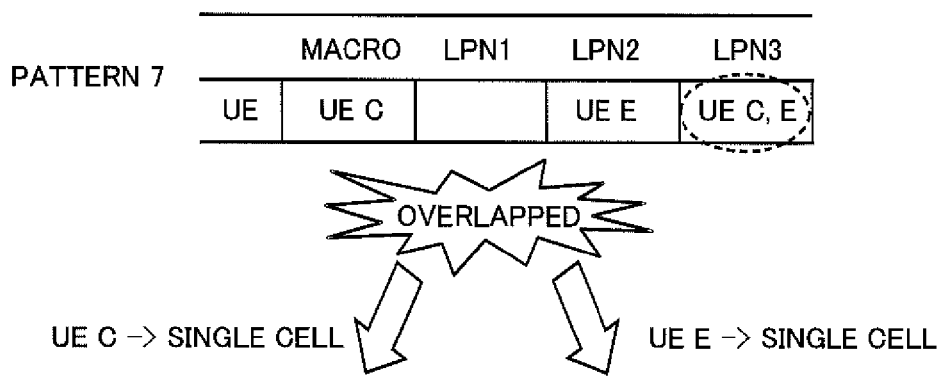
FIG. 9A shows patterns in which there are two user terminals to request CoMP transmission and cells that are selected overlap.
FIG. 9B shows a pattern in which, when terminal groups overlap, one of the terminal groups is changed to single cell transmission.

FIG. 9A shows a pattern where there are two user terminals that request CoMP transmission and where the allocation of user terminals overlaps between cells. For example, in the event of pattern 7, the macro base station selects user terminal UE C that is connected to the macro base station and UE E that is connected to LPN 2 as user terminals to request CoMP transmission (step ST 2). UE C designates a set of the macro base station and LPN 3 as CoMP transmission cell candidates (FIG. 7B). Consequently, the macro base station selects LPN 3 which UE C designates as a coordinated cell in CoMP transmission (step ST 3). Also, UE E designates a set of LPN 2 and LPN 3 as CoMP transmission cell candidates (FIG. 7B). Consequently, the macro base station selects LPN 3 which UE E designates as a coordinated cell in CoMP transmission (step ST 3). However, in this case, UE C and UE E are allocated to LPN 3 in an overlapping manner.

Also, in the event of pattern 8, the macro base station selects user terminal UE D that is connected to LPN 1 and UE E that is connected to LPN 2 as user terminals to request CoMP transmission (step ST 2). UE D designates a set of LPN 1 and LPN 2 as CoMP transmission cell candidates (FIG. 7B). Consequently, the macro base station selects LPN 2 which UE D designates as a coordinated cell in CoMP transmission (step ST 3). Also, UE E designates a set of LPN 2 and LPN 3 as CoMP transmission cell candidates (FIG. 7B). Consequently, the macro base station selects LPN 3 which UE E designates as a coordinated cell in CoMP transmission (step ST 3). However, in this case, in LPN 2, UE D and UE E are allocated in an overlapping manner.

Also, in the event of pattern 9, the macro base station selects user terminal UE A that is connected to the macro base station and UE D that is connected to LPN 1 as user terminals to request CoMP transmission (step ST 2). UE A designates a set of the macro base station and LPN 1 as CoMP transmission cell candidates (FIG. 7B). Consequently, the macro base station selects LPN 1 which UE A designates as a coordinated cell in CoMP transmission (step ST 3). Also, UE D designates a set of LPN 1 and LPN 2 as CoMP transmission cell candidates (FIG. 7B). Consequently, the macro base station selects LPN 2 which UE D designates as a coordinated cell in CoMP transmission (step ST 3). However, in this case, UE A and UE D are allocated to LPN 1 in an overlapping manner.

In this way, when the allocation of user terminals overlaps between cells, it is possible to cancel the overlap by changing one of the overlapping user terminals to single cell transmission. To be more specific, for example, as shown in FIG. 9B, one of user terminals UE C and UE E that overlap in LPN 3 of pattern 7 is changed to single cell transmission. In this case, when single cell transmission is applied to UE C, the priority of that pattern becomes lower than pattern 4, and, when single cell transmission is applied to UE E, the pattern becomes the same as pattern 2. That is, when the allocation of user terminals overlaps between cells, even when part of the allocation of user terminals is changed to cancel the overlap, its priority does not become higher than the priorities of the other patterns. Then, with the present invention, when the allocation of user terminals overlaps between cells, that pattern is excluded from the calculation of priority in the next step. By this means, it is possible to avoid unnecessary calculation.

As a result of above-described step ST 3, when a candidate pattern to be applied to CoMP transmission is determined, the eNB calculates the priority of the determined candidate pattern (step ST 4). Then, the eNB performs scheduling according to the radio resource allocation pattern of the highest priority among a plurality of candidate patterns.

Figure 10:
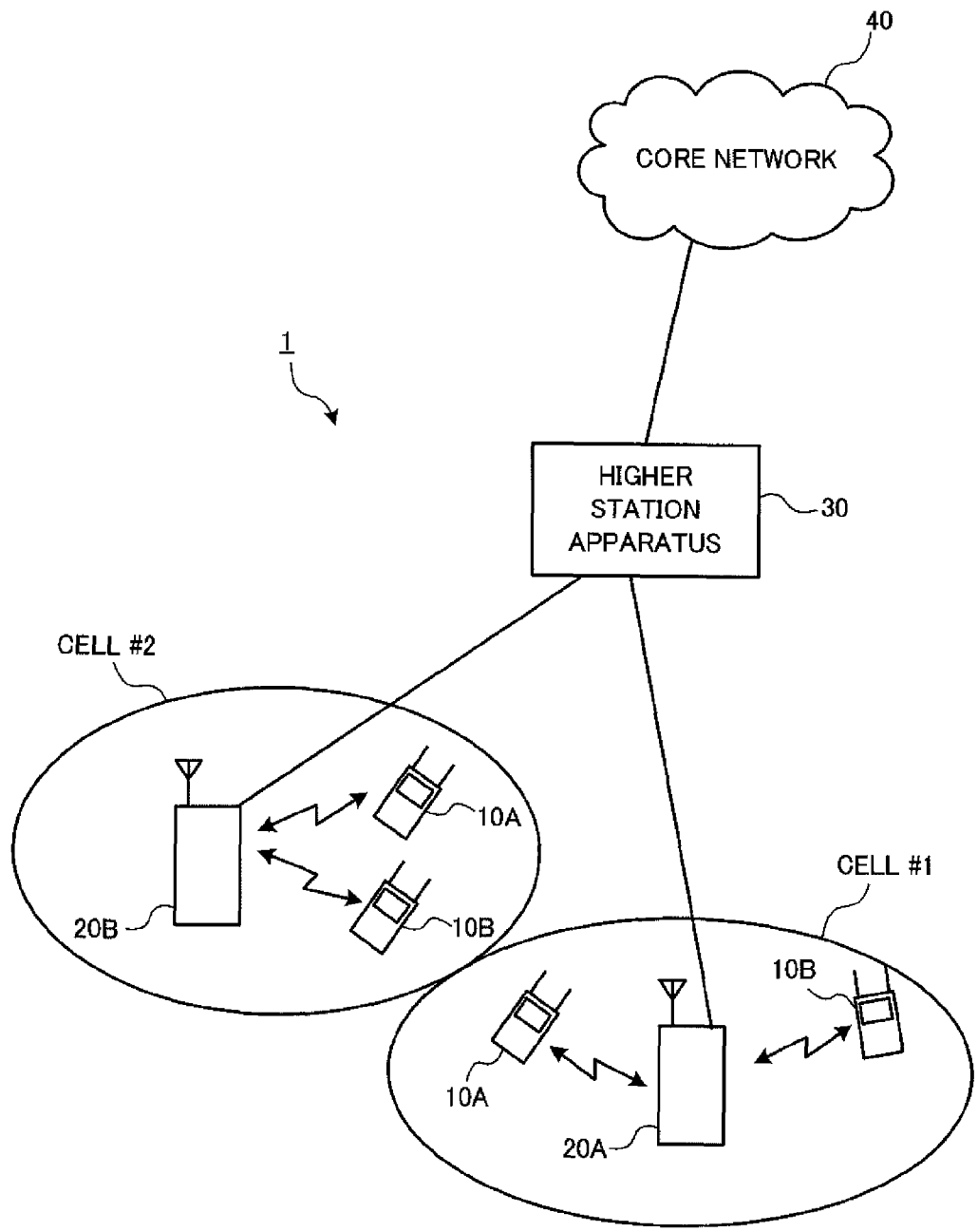
FIG. 10 is a diagram to explain a system configuration of a radio communication system.

Now, embodiments of the present invention will be described below in detail. FIG. 10 is a diagram to explain a system configuration of a radio communication system according to the present embodiment. Note that the radio communication system shown in FIG. 10 is a system to accommodate, for example, the LTE system or SUPER 3G. In this radio communication system, carrier aggregation, which groups a plurality of fundamental frequency blocks into one, where the system band of the LTE system is one unit, is used. Also, this radio communication system may be referred to as "IMT-Advanced" or may be referred to as "4G."

As shown in FIG. 10, the radio communication system 1 is configured to include radio base station apparatuses 20A and 20B, and a plurality of the first and second user terminals 10A and 10B that communicate with these radio base station apparatuses 20A and 20B. The radio base station apparatuses 20A and 20B are connected with a higher station apparatus 30, and this higher station apparatus 30 is connected with a core network 40. Also, the base station apparatuses 20A and 20B are connected with each other by wire connection or by wireless connection. The first and second user terminals 10A and 10B are able to communicate with the radio base station apparatuses 20A and 20B in cell #1 and cell #2. Note that the higher station apparatus 30 includes, for example, an access gateway apparatus, a radio network controller (RNC), a mobility management entity (MME) and so on, but is by no means limited to these.

Although the first and second user terminals 10A and 10B may be either LTE terminals or LTE-A terminals, the following description will be given simply with respect to the first and second user terminals 10A and 10B, unless specified otherwise. Also, although, for ease of explanation, the radio base station apparatuses 20A and 20B and the first and second user terminals 10A and 10B, which are mobile terminal apparatuses, will be described to perform radio communication, more generally, the first and second user terminals 10A and 10B may be user apparatuses including fixed terminal apparatuses.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink, but the radio access schemes are by no means limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels will be described. The downlink communication channels include a PDSCH (Physical Downlink Shared CHannel), which is used by the first and second user terminals 10A and 10B on a shared basis as a downlink data channel, and downlink L1/L2 control channels (PDCCH, PCFICH, PHICH). Transmission data and higher control information are transmitted by the PDSCH. PDSCH and PUSCH scheduling information and so on are transmitted by the PDCCH (Physical Downlink Control CHannel). The number of OFDM symbols to use for the PDCCH is transmitted by the PCFICH (Physical Control Format Indicator CHannel). HARQ ACK and NACK for the PUSCH are transmitted by the PHICH (Physical Hybrid-ARQ Indicator CHannel).

The uplink communication channels include a PUSCH, which is used by the user terminals 10A and 10B on a shared basis as an uplink data channel, and a PUCCH, which is an uplink control channel. By means of this PUSCH, transmission data and higher control information are transmitted. Also, by means of the PUCCH, downlink radio quality information (CQI: Channel Quality Indicator), ACK/NACK and so on are transmitted.

Figure 11:
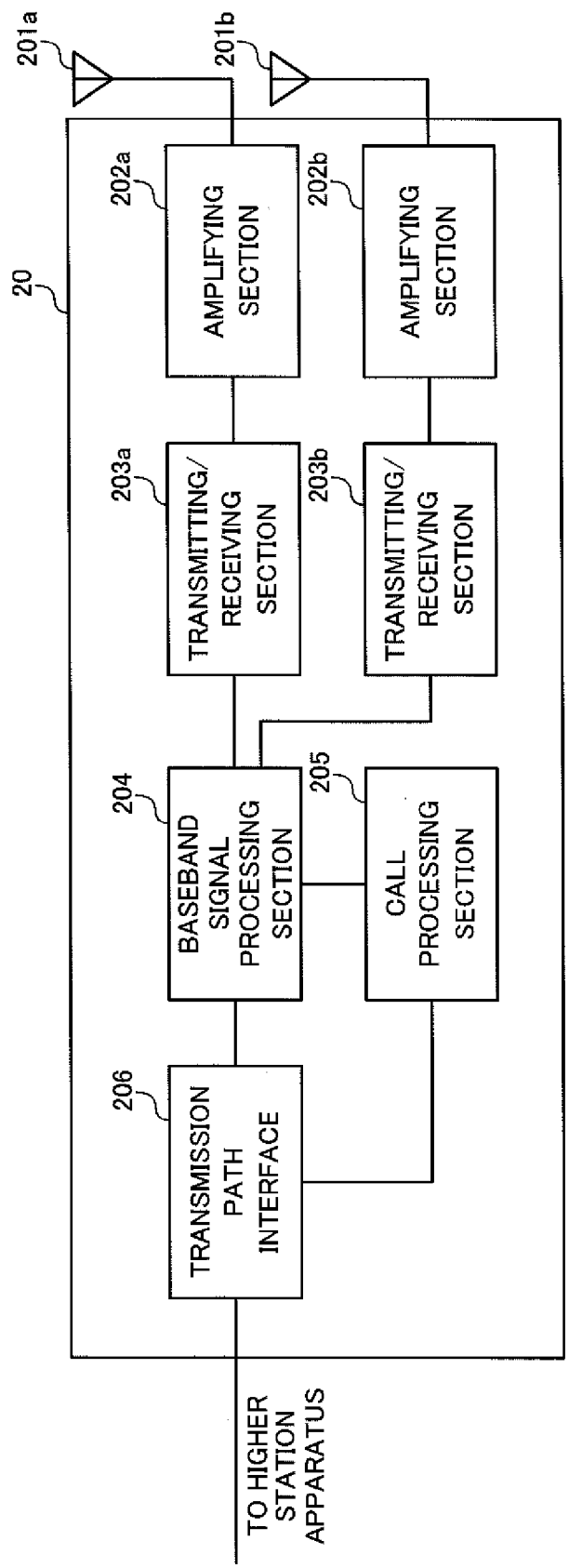
FIG. 11 is a block diagram to show an overall configuration of a radio base station apparatus.

Referring to FIG. 11, an overall configuration of a radio base station apparatus according to the present embodiment will be described. Note that the radio base station apparatuses 20A and 20B have the same configuration and therefore hereinafter will be described simply as "radio base station apparatus 20." Also, the first and second user terminals 10A and 10B also have the same configuration and therefore hereinafter will be described simply as "user terminal 10." The radio base station apparatus 20 has transmitting/receiving antennas 201 (201*a* and 201*b*), amplifying sections 202 (202*a* and 202*b*), transmitting/receiving sections 203 (203*a* and 203*b*), a baseband signal processing section 204, a call processing section 205, and a transmission path interface 206. Transmission data to be transmitted from the radio base station apparatus 20 to the user terminal 10 on the downlink is input from the higher station apparatus 30, into the baseband signal processing section 204, via the transmission path interface 206.

In the baseband signal processing section 204, a downlink data channel signal is subjected to PDCP layer processes, division and coupling of transmission data, RLC (Radio Link Control) layer transmission processes such as an RLC retransmission control transmission process, MAC (Medium Access Control) retransmission control, including, for example, a HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

Also, the baseband signal processing section 204 reports control information for allowing each user terminal 10 to perform radio communication with the radio base station apparatus 20, to the user terminals 10 connected to the same cell, by a broadcast channel. Information for communication in the cell includes, for example, the system bandwidth on the uplink or the downlink, identification information of a root sequence (root sequence index) for generating signals of random access preambles of the PRACH (Physical Random Access CHannel), and so on.

In the transmitting/receiving sections 203a and 203b, baseband signals that are output from the baseband signal processing section 204 are converted into a radio frequency band. The radio frequency signals having been subjected to frequency conversion are amplified in the amplifying sections 202a and 202b and output to the transmitting/receiving antennas 201a and 201b.

As for signals to be transmitted from the user terminal 10 to the radio base station apparatus 20 on the uplink, radio frequency signals that are received in the transmitting/receiving antennas 201 are amplified in the amplifying sections 202a and 202b, converted into baseband signals by frequency conversion in the transmitting/receiving sections 203a and 203b, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Next, referring to FIG. 12, an overall configuration of a user terminal according to the present embodiment will be described. An LTE terminal and an LTE-A terminal have the same hardware configurations in principle parts, and therefore will be described indiscriminately. The user terminal 10 has a transmitting/receiving antenna 101, an amplifying section 102, a transmitting/receiving section 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Now, the function blocks of a radio base station apparatus will be described with reference to FIG. 13. The radio base station apparatus shown in FIG. 13 has a centralized control-type radio base station configuration. In the event of centralized control, a given radio base station apparatus (central radio base station apparatus, which is cell #1 in FIG. 13) executes radio resource allocation control such as scheduling, altogether, and a serving radio base station apparatus (remote radio equipment, which is cell #2 in FIG. 13) follows the radio resource allocation result by the radio base station apparatus. In this case, cell selection information reported from the user terminals is gathered in the central radio base station apparatus, and is used for radio resource allocation for CoMP transmission.

Figure 13:
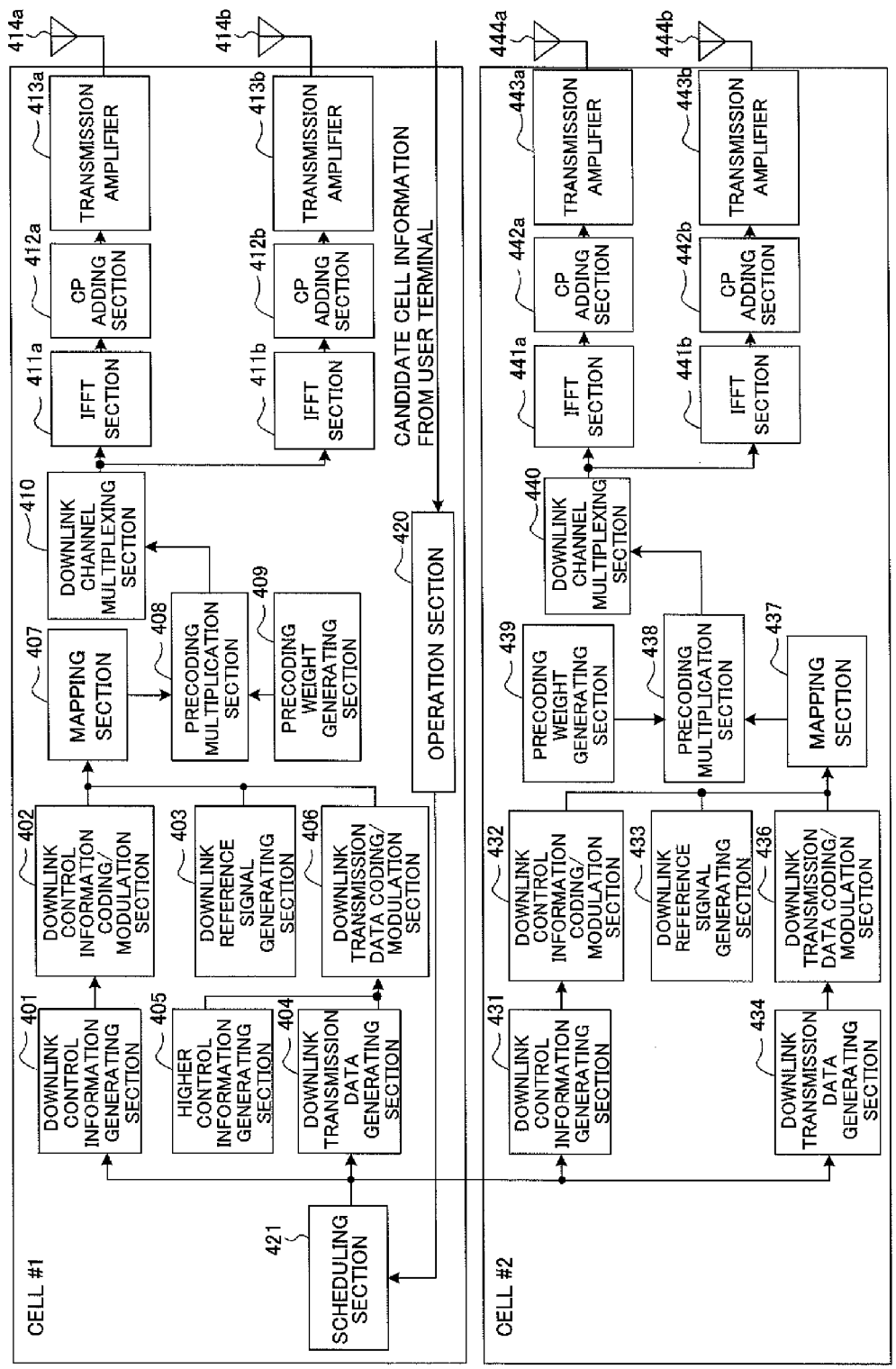
FIG. 13 is a block diagram to show a configuration of a baseband processing section of a centralized control-type radio base station apparatus.

Note that the function blocks of FIG. 13 primarily relate to the processing content of the baseband processing section 204 shown in FIG. 11. Also, the function blocks shown in FIG. 13 are simplified to explain the present invention, and assumed to have the configurations which a baseband processing section 204 should normally have.

The central radio base station apparatus (cell #1) has, as components of the transmitting side, a downlink control information generating section 401, a downlink control information coding/modulation section 402, a downlink reference signal generating section 403, a downlink transmission data generating section 404, a higher control information generating section 405, and a downlink transmission data coding/modulation section 406. Also, the central radio base station apparatus (cell #1) has, as components of the transmitting side, a mapping section 407, a precoding multiplication section 408, a precoding weight generating section 409, a downlink channel multiplexing section 410, IFFT sections 411 (411a and 411b), CP adding sections 412 (412a and 412b), transmission amplifiers 413 (413a and 413b), transmitting antennas 414 (414a and 414b), an operation section 420, and a scheduling section 421. Note that the transmission amplifiers 413 and the transmitting antennas 414 correspond to the amplifying sections 202 and the transmitting/receiving antennas 201 shown in FIG. 11, respectively.

Meanwhile, the remote radio equipment (cell #2) has, as components of the transmitting side, a downlink control information generating section 431, a downlink control information coding/modulation section 432, a downlink reference signal generating section 433, a downlink transmission data generating section 434 and a downlink transmission data coding/modulation section 436. Also, the remote radio equipment (cell #2) has, as components of the transmitting side, a mapping section 437, a precoding multiplication section 438, a precoding weight generating section 439, a downlink channel multiplexing section 440, IFFT sections 441 (441a and 441b), CP adding sections 442 (442a and 442b), transmission amplifiers 443 (443a and 443b) and transmitting antennas 444 (444a and 444b). Note that the central radio base station apparatus and the remote radio equipment are connected by, for example, optical fiber.

The downlink control information generating sections 401 and 431 each generate downlink control information by control of the scheduling section 421, and output the downlink control information to the downlink control information coding/modulation sections 402 and 432, respectively. The downlink control information coding/modulation sections 402 and 432 perform channel coding and data modulation of the downlink control information, and output the results to the mapping sections 407 and 437, respectively.

The downlink reference signal generating sections 403 and 433 generate downlink reference signals (CRS, CSI-RS, DM-RS), and output these downlink reference signals to the mapping sections 407 and 437, respectively. The downlink transmission data generating sections 404 and 434 generate downlink transmission data, and output the downlink transmission data to the downlink transmission data coding/modulation sections 406 and 436, respectively.

The higher control information generating section 405 generates higher control information that is transmitted and received by higher layer signaling (for example, RRC signaling), and outputs the generated higher control information to the downlink transmission data coding/modulation section 406.

The downlink transmission data coding/modulation section 406 performs channel coding and data modulation for the downlink transmission data and higher control information, and outputs the results to the mapping section 407. The downlink transmission data coding/modulation section 436 performs channel coding and data modulation of the downlink transmission data, and outputs the results to the mapping section 437.

The mapping sections 407 and 437 map the downlink control information, downlink reference signals, downlink transmission data and higher control information, and output them to the precoding multiplication sections 408 and 438, respectively.

The precoding weight generating sections 409 and 439 generate precoding weights based on PMIs that are fed back from the user terminal 10, and output them to the precoding multiplication sections 408 and 438. To be more specific, the preceding weight generating sections 409 and 439 each have a codebook, and select precoding weights corresponding to the PMIs from the codebooks.

The precoding multiplication sections 408 and 438 multiply transmission signals by the precoding weights. That is to say, the precoding multiplication sections 408 and 438 apply a phase shift and/or an amplitude shift, for each of the transmitting antennas 414a and 414b and the transmitting antennas 444a and 444b, based on the precoding weights provided from the precoding weight generating sections 409 and 439. The precoding multiplication sections 408 and 438 output the transmission signals, to which a phase shift and/or an amplitude shift has been applied, to the downlink channel multiplexing sections 410 and 440, respectively.

The downlink channel multiplexing sections 410 and 440 combine the downlink control information, downlink reference signals, higher control information and downlink transmission data, to which a phase shift and/or an amplitude shift has been applied, and generate transmission signals for each of the transmitting antennas 414a and 414b and the transmitting antennas 444a and 444b. The downlink channel multiplexing sections 410 and 440 output the transmission signals to the IFFT (Inverse Fast Fourier Transform) sections 411a and 411b and the IFFT sections 441a and 441b, respectively.

The IFFT sections 411a and 411b and the IFFT sections 441a and 441b perform an IFFT of the transmission signals, and output the transmission signals after the IFFT to the CP adding sections 412a and 412b and the CP adding sections 442a and 442b. The CP adding sections 412a and 412b and the CP adding sections 442a and 442b add CPs (Cyclic Prefixes) to the transmission signals after the IFFT, and output the transmission signals, to which CPs have been added, to the transmission amplifiers 413a and 413b and the transmission amplifiers 443a and 443b, respectively.

The transmission amplifiers 413a and 413b and the transmission amplifiers 443a and 443b amplify the transmission signals, to which CPs have been added. The amplified transmission signals are transmitted respectively to the user terminal 10, from the transmitting antennas 414a and 414b and the transmitting antennas 444a and 444b, on the downlink.

The operation section 420 determines a pattern to be a radio resource allocation candidate in CoMP transmission based on candidate cell information reported from the user terminal 10. To be more specific, the operation section 420 generates an allocation pattern that is optimized for single cell transmission, and calculates its priority (step ST 1). Also, the operation section 420 selects a user terminal 10 requesting CoMP transmission to the serving cell (step ST 2), and, by selecting the cell which that user terminal 10 designates as a coordinated cell in CoMP transmission (step ST 3), generates a candidate pattern of radio resource allocation in CoMP transmission. Having generated a candidate pattern, the operation section 420 then calculates its priority. Information about the calculated priority is reported to the scheduling section 421.

The scheduling section 421 executes scheduling based on the priority of the reported allocation pattern that is optimized for single cell transmission and the priority of the radio resource allocation candidate pattern in CoMP transmission. To be more specific, the scheduling section 421 executes scheduling of each cell such that radio resources are allocated in the pattern in which the priority is the highest among these patterns.

The function blocks of a radio base station apparatus having a different configuration from the radio base station apparatus shown in FIG. 13 will be described with reference to FIG. 14. The radio base station apparatus shown in FIG. 14 has an autonomous distributed control-type radio base station configuration. In the event of autonomous distributed control, a plurality of radio base station apparatuses each execute radio resource allocation control such as scheduling. In this case, cell selection information reported from the user terminals is gathered in a given radio base station apparatus, and is used for radio resource allocation for CoMP transmission.

Figure 14:
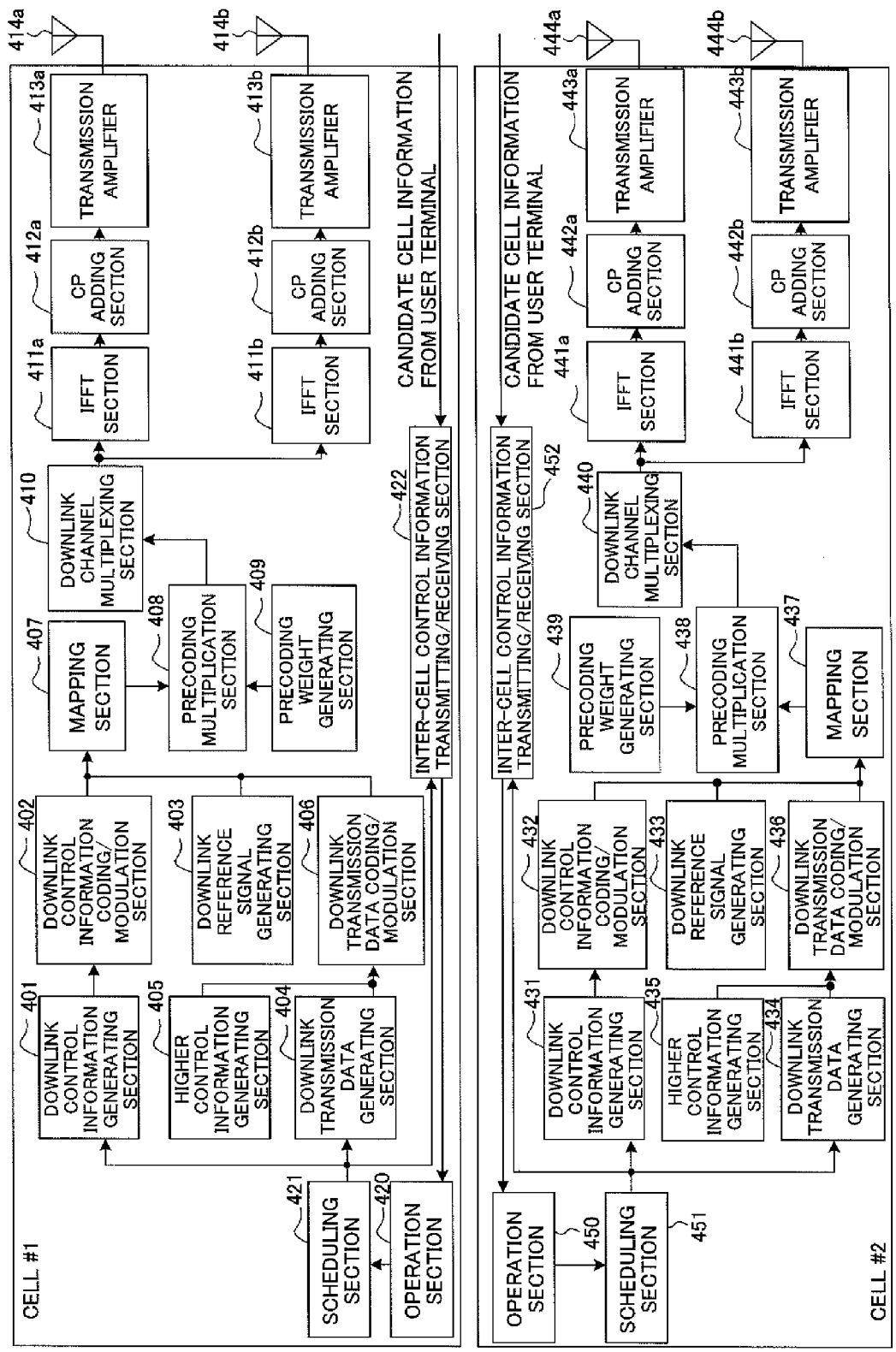
FIG. 14 is a block diagram to show a configuration of a baseband processing section of an autonomous distributed control-type radio base station apparatus.

Note that the function blocks of FIG. 14 primarily relate to the processing content of the baseband processing section 204 shown in FIG. 11. Also, the function blocks shown in FIG. 14 are simplified to explain the present invention, and assumed to have the configurations which a baseband processing section 204 should normally have. Also, function blocks in FIG. 14 that are the same as in FIG. 13 will be assigned the same codes as in FIG. 13, and their detailed descriptions will be omitted.

On the cell #1 side, as components of the transmitting side, a downlink control information generating section 401, a downlink control information coding/modulation section 402, a downlink reference signal generating section 403, a downlink transmission data generating section 404, a higher control information generating section 405, a downlink transmission data coding/modulation section 406, a mapping section 407, a precoding multiplication section 408, a precoding weight generating section 409, a downlink channel multiplexing section 410, IFFT sections 411 (411a and 411b), CP adding sections 412 (412a and 412b), transmission amplifiers 413 (413a and 413b), transmitting antennas 414 (414a and 414b), an operation section 420, a scheduling section 421, and an inter-cell control information transmitting/receiving section 422, are provided.

Similarly, on the cell #2 side, a downlink control information generating section 431, a downlink control information coding/modulation section 432, a downlink reference signal generating section 433, a downlink transmission data generating section 434, a higher control information generating section 435, a downlink transmission data coding/modulation section 436, a mapping section 437, a precoding multiplication section 438, a precoding weight generating section 439, a downlink channel multiplexing section 440, IFFT sections 441 (441a and 441b), CP adding sections 442 (442a and 442b), transmission amplifiers 443 (443a and 443b), transmitting antennas 444 (444a and 444b), a operation section 450, a scheduling section 451 and an inter-cell control information transmitting/receiving section 452, are provided.

The functions of the operation section 450 and scheduling section 451 on the cell #2 side are the same as the functions of the operation section 420 and the scheduling section 421 on the cell #1 side, respectively. The inter-cell control information transmitting/receiving sections 422 and 452 are connected by an X2 interface, mutually transmit and receive candidate cell information reported from the user terminal, and also mutually transmit and receive information about the priority of a candidate pattern calculated in the operation section 420 or 450.

That is to say, the operation sections 420 and 450 determine a pattern to be a radio resource allocation candidate in CoMP transmission, based on candidate cell information that is acquired from the user terminal 10 of the subject cell and candidate cell information that is acquired from the user terminals 10 of other cells through the inter-cell control information transmitting/receiving sections 422 and 452. To be more specific, the operation sections 420 and 450 generate an allocation pattern that is optimized for single cell transmission and calculate its priority (step ST 1). Also, the operation sections 420 and 450 select a user terminal 10 requesting CoMP transmission to the serving cell (step ST 2), and, by selecting the cell which that user terminal 10 designates as a coordinated cell in CoMP transmission (step ST 3), generates a candidate pattern of radio resource allocation in CoMP transmission. Having generated a candidate pattern, the operation sections 420 and 450 then calculate its priority. Information about the calculated priority is reported to the scheduling sections 421 and 451 directly or through the inter-cell control information transmitting/receiving sections 422 and 452.

The scheduling sections 421 and 451 execute scheduling based on the priority of the reported allocation pattern that is optimized for single cell transmission and the priority of the radio resource allocation candidate pattern in CoMP transmission. To be more specific, the scheduling sections 421 and 451 execute scheduling of each cell such that radio resources are allocated in the pattern in which the priority is the highest among these patterns.

Figure 15:
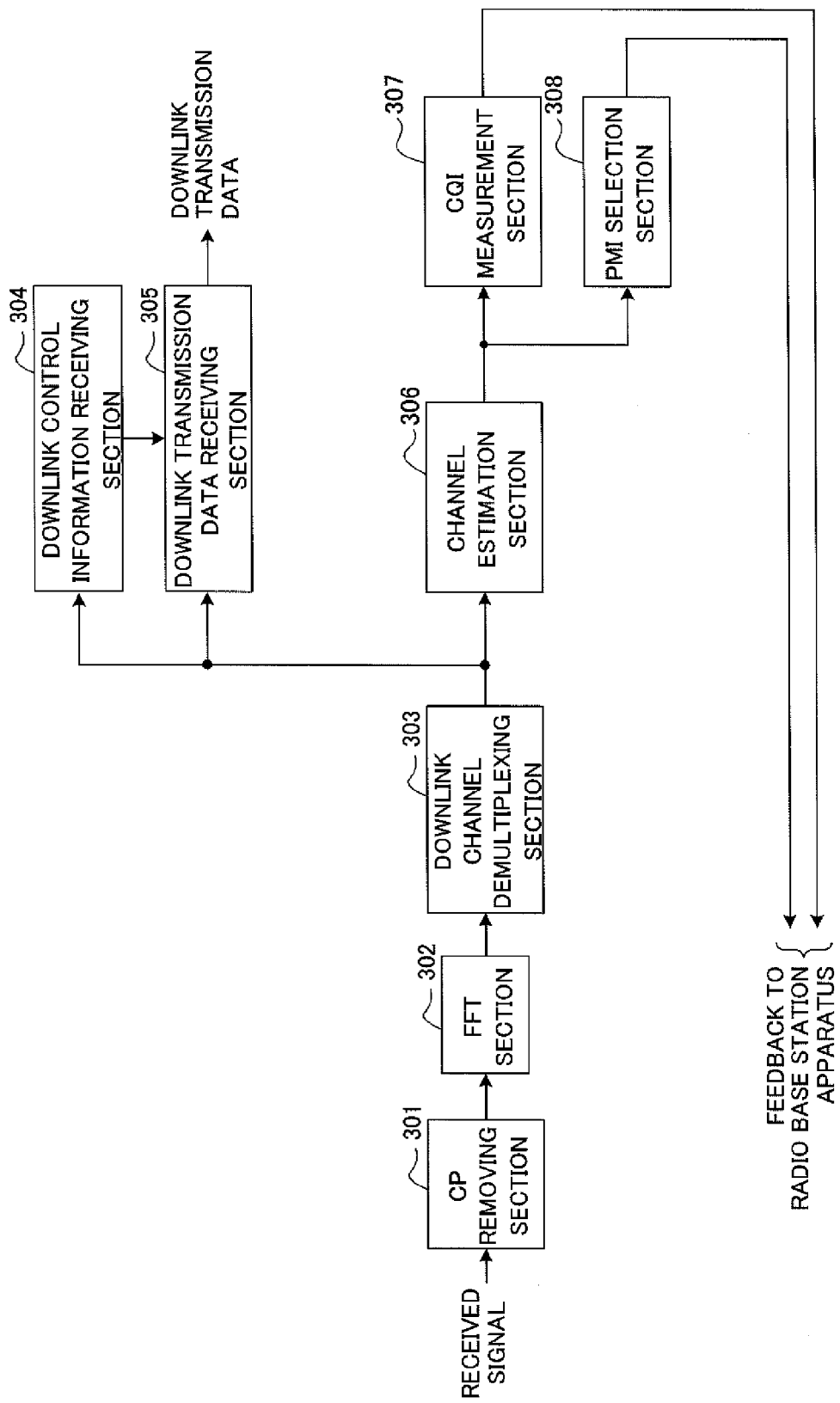
FIG. 15 is a block diagram to show a configuration of a baseband signal processing section in a user terminal.

The function blocks of a user terminal will be described with reference to FIG. 15. Note that the function blocks of FIG. 15 primarily relate to the processing content of the baseband processing section 104 shown in FIG. 12. Also, the function blocks shown in FIG. 15 are simplified to explain the present invention, and assumed to have the configurations which a baseband processing section should normally have.

The receiving section of the user terminal has a CP removing section 301, an FFT section 302, a downlink channel demultiplexing section 303, a downlink control information receiving section 304, a downlink transmission data receiving section 305, a channel estimation section 306, a CQI measurement section 307 and a PMI selection section 308.

Figure 12:
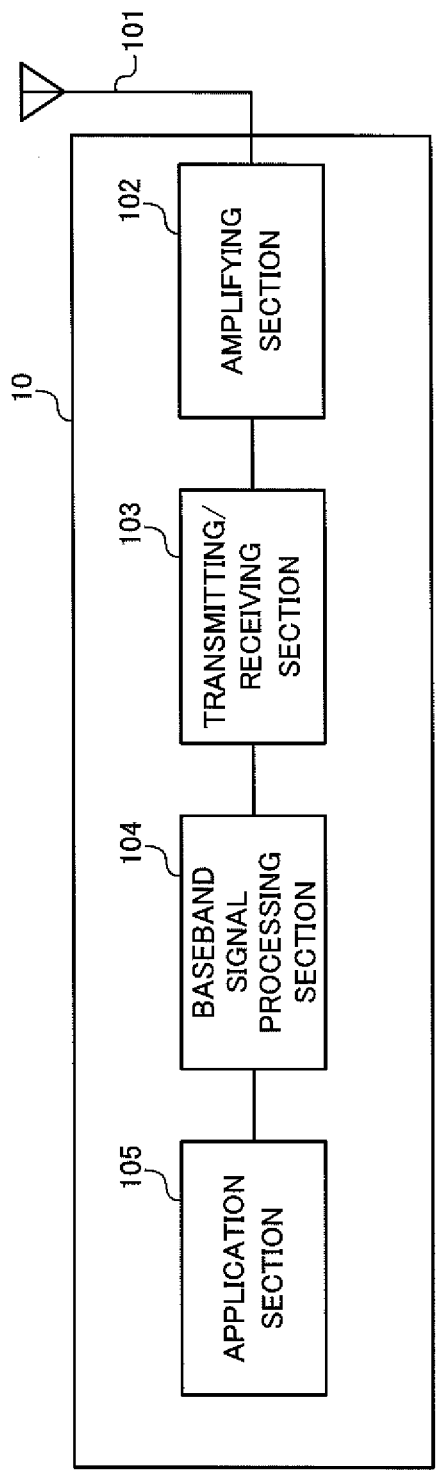
FIG. 12 is a block diagram to show an overall configuration of a user terminal.

A transmission signal that is transmitted from the radio base station apparatus 20 is received in the transmitting/receiving antenna 101 shown in FIG. 12, and output to the CP removing section 301. The CP removing section 301 removes the CPs from the received signal, and outputs the result to the FFT section 302. The FFT section 302 performs a fast Fourier transform (FFT) of the signal, from which the CPs have been removed, and converts the time domain signal into a frequency domain signal. The FFT section 302 outputs the signal having been converted into a frequency domain signal, to the downlink channel demultiplexing section 303. The downlink channel demultiplexing section 303 demultiplexes the downlink channel signal into downlink control information, downlink transmission data, higher control information and downlink reference signals. The downlink channel demultiplexing section 303 outputs the downlink control information to the downlink control information receiving section 304, outputs the downlink transmission data and the higher control information to the downlink transmission data receiving section 305, and outputs the downlink reference signals to the channel estimation section 306.

The downlink control information receiving section 304 demodulates the downlink control information, and outputs the demodulated control information to the downlink transmission data receiving section 305. The downlink transmission data receiving section 305 demodulates the downlink transmission data using the control information. The channel estimation section 306 estimates the channel state using the downlink reference signal, and outputs the estimated channel state to the CQI measurement section 307 and the PMI selection section 308.

The CQI measurement section 307 measures CQI from the channel state reported from the channel estimation section 306. The PMI selection section 308 selects PMI, from the channel state reported from the channel estimation section 306, using a codebook. The PMI selected in the PMI selection section 308 is reported to the radio base station apparatus 20 as feedback information.

In the radio communication system of the above configuration, first, user terminal 10 reports a set of cells to be CoMP transmission cell candidates, to the radio base station apparatus 20 as candidate cell information. The set of cells to be CoMP transmission cell candidates can be selected according to, for example, the received quality (for example, RSRP) of each cell.

Next, the radio base station apparatus 20 determines a pattern to be a radio resource allocation candidate in CoMP transmission based on the candidate cell information reported from the user terminal 10. That is to say, the radio base station apparatus 20 generates an allocation pattern that is optimized for single cell transmission and calculates its priority (step ST 1). Also, the radio base station apparatus 20 selects a user terminal 10 that requests CoMP transmission to the serving cell (step ST 2), and selects the cell which that user terminal 10 designates as a coordinated cell in CoMP transmission (step ST 3). By this means, the radio base station apparatus 20 generates a candidate pattern of radio resource allocation in CoMP transmission.

Having generated a candidate pattern, the radio base station apparatus 20 then calculates its priority. Then, each cell is scheduled such that, among the individual patterns, radio resources are allocated in the pattern in which the priority is the highest.

As described above, according to the present invention, the priority of a pattern to be a candidate for radio resource allocation, which is determined based on candidate cell information that is reported from a user terminal and that shows a candidate of a cell to execute coordinated multiple point transmission, is calculated, and scheduling is executed based on the calculated priority, so that it is possible to realize high transmission rate while reducing the calculation load involved in CoMP scheduling.

The present invention is by no means limited to the descriptions contained herein, and can be implemented in various modifications. For example, the relationships of connections and functions of components shown herein can be implemented with various changes. Also, the configurations shown herein can be implemented in various adequate combinations. In addition, the present invention can be implemented in various modifications without departing from the spirit of the present invention.

The disclosure of Japanese Patent Application No. 2011-256054, filed on Nov. 24, 2011, including the specification, drawings and abstract, is incorporated herein by reference in its entirety.

The invention claimed is:

1. A radio communication system comprising a plurality of radio base station apparatuses; and
    a user terminal that performs coordinated multiple point transmission/reception with the plurality of radio base station apparatuses, wherein:
    one of the radio base station apparatuses comprises:
    an operation section that generates a pattern for radio resource allocation, that indicates a serving cell of the user terminal and a candidate cell for coordinated multiple point transmission, based on candidate cell information that is reported from the user terminal and shows a candidate of a cell to perform coordinated multiple point transmission, and calculates a priority of the pattern; and
a scheduling section that executes scheduling based on the priority calculated in the operation section; and
the user terminal comprises:
a transmitting/receiving section that reports the candidate cell information to the radio base station apparatus.

2. The radio communication system according to claim 1, wherein the pattern indicates a serving cell of another user terminal, and
the operation section calculates the priority of the pattern by summing up priorities of the user terminal and the another user terminal that are assigned weight by proportional fairness (PF).

3. The radio communication system according to claim 1, wherein the operation section excludes a pattern including a cell where radio resource allocation overlaps between the user terminal and another user terminal, among patterns to be candidates, from calculation of priority.

4. The radio communication system according to claim 1, wherein, among patterns to be candidates, the scheduling section executes scheduling in a pattern of the highest priority.

5. The radio communication system according to claim 1, wherein the priority is determined using proportional fairness.

6. The radio communication system according to claim 1, wherein
the operation section generates another pattern based on single cell scheduling of the user terminal and calculates a priority of the another pattern, and
the scheduling section executes scheduling based on the priorities calculated in the operation section, using one of the pattern and the another pattern.

7. A radio base station apparatus in a radio communication system comprising a plurality of radio base station apparatuses; and
a user terminal that performs coordinated multiple point transmission/reception with the plurality of radio base station apparatuses,
the radio base station apparatus comprising:
an operation section that generates a pattern for radio resource allocation, that indicates a serving cell of the user terminal and a candidate cell for coordinated multiple point transmission based on candidate cell information that is resorted from the user terminal and shows a candidate of a cell to perform coordinated multiple point transmission, and calculates a priority of the pattern; and
a scheduling section that executes scheduling based on the priority calculated in the operation section.

8. The radio base station apparatus, according to claim 7, wherein the pattern indicates a serving cell of another user terminal, and
the operation section calculates the priority of the pattern by summing up priorities of the user terminal and the another user terminal, that are assigned weight by proportional fairness (PF).

9. The radio base station apparatus according to claim 7, wherein the operation section excludes a pattern including a cell where radio resource allocation overlaps between the user terminal and another user terminal, among patterns to be candidates, from calculation of priority.

10. The radio base station apparatus according to claim 7, wherein, among patterns to be candidates, the scheduling section executes scheduling in a pattern of the highest priority.

11. The radio base station apparatus according to claim 7, wherein the priority is determined using proportional fairness.

12. The radio base station apparatus according to claim 7, wherein
the operation section generates another pattern based on single cell scheduling of the user terminal and calculates a priority of the another pattern, and
the scheduling section executes scheduling based on the priorities calculated in the operation section, using one of the pattern and the another pattern.

13. A radio communication method in a radio communication system comprising a plurality of radio base station apparatuses; and
a user terminal that performs coordinated multiple point transmission/reception with the plurality of radio base station apparatuses, the radio communication method comprising the steps of:
at one of the radio base station apparatuses:
generating a pattern for radio resource allocation, that indicates a serving cell of the user terminal and a candidate cell for coordinated multiple point transmission, based on candidate cell information that is reported from the user terminal and shows a candidate of a cell to perform coordinated multiple point transmission, and calculates a priority of the pattern; and
executing scheduling based on the priority calculated in the operation section; and
at the user terminal:
reporting the candidate cell information to the radio base station apparatus.

14. The radio communication method according to claim 13, wherein the pattern indicates a serving cell of another user terminal and the priority of the pattern is calculated by summing up priorities of the user terminal and the another user terminal, that are assigned weight by proportional fairness (PF).

15. The radio communication method according to claim 13, wherein, among patterns to be candidates, a pattern including a cell where radio resource allocation overlaps between the user terminal and another user terminal is excluded from calculation of priority.

16. The radio communication method according to claim 13, wherein, among patterns to be candidates, scheduling is executed in a pattern of the highest priority.

17. The radio communication method according to claim 13, wherein the priority is determined using proportional fairness.

18. The radio communication method according to claim 13, wherein
generating another pattern based on single cell scheduling of the user terminal and calculating a priority of the another pattern, and
executing scheduling based on the priorities calculated using one of the pattern and the another pattern.

* * * * *